US012604274B2

(12) United States Patent    (10) Patent No.:   US 12,604,274 B2

Fujii et al.    (45) Date of Patent:   Apr. 14, 2026

(54) RELAY BASE STATION, AND METHOD AND COMPUTER PROGRAM FOR RELAYING COMMUNICATION

(71) Applicant: TOYOTA JIDOSHA KABUSHIKI KAISHA, Toyota (JP)

(72) Inventors: Shinichiroh Fujii, Kawasaki (JP); Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 18/336,642

(22) Filed: Jun. 16, 2023

(65) Prior Publication Data

US 2023/0422178 A1    Dec. 28, 2023

(30) Foreign Application Priority Data

Jun. 22, 2022    (JP) ................................ 2022-100687

(51) Int. Cl.
*H04W 52/02*     (2009.01)
*H04W 52/46*     (2009.01)

(52) U.S. Cl.
CPC ..... *H04W 52/0277* (2013.01); *H04W 52/028* (2013.01); *H04W 52/46* (2013.01)

(58) Field of Classification Search
CPC ... H04W 40/22; H04W 52/0277; H04W 4/40; H04W 52/028; H04W 52/46; H04W 88/08; H04B 7/155; Y02D 30/70
See application file for complete search history.

(56) References Cited

U.S. PATENT DOCUMENTS

| | | |
|---|---|---|
| 5,815,824 A | 9/1998 | Saga et al. |
| 2010/0234071 A1 | 9/2010 | Shabtay et al. |
| 2013/0070664 A1 | 3/2013 | Nagata et al. |
| 2018/0084481 A1 | 3/2018 | Wang et al. |
| 2019/0159147 A1 | 5/2019 | Ryu et al. |
| 2020/0296795 A1 | 9/2020 | Uchiyama et al. |
| 2020/0389807 A1 | 12/2020 | Otaka |
| 2021/0136628 A1 | 5/2021 | Uchiyama |

(Continued)

FOREIGN PATENT DOCUMENTS

| | | | |
|---|---|---|---|
| JP | 8-240435 A | | 9/1996 |
| JP | 2004032164 A | * | 1/2004 |
| JP | 2007-153250 A | | 6/2007 |

(Continued)

OTHER PUBLICATIONS

JP2004032164A-English Translated (Year: 2025).*
JP4113376B2-English Translated (Year: 2025).*

*Primary Examiner* — Ji-Hae Yea

(74) *Attorney, Agent, or Firm* — Sughrue Mion, PLLC

(57) ABSTRACT

A relay base station mounted on a vehicle and configured to relay wireless communication between a base station and at least one communication terminal by power supply from a battery of the vehicle includes a processor configured to set a restriction level of the function of relaying wireless communication between the base station and the at least one communication terminal, based on at least one of travel power information on electric power used for travel control of the vehicle and remaining power information indicating remaining power of the battery of the vehicle, and relay the wireless communication according to the set restriction level.

6 Claims, 6 Drawing Sheets

| ESTIMATE OF TRAVEL ELECTRIC POWER | REMAINING POWER VALUE | RESTRICTION INDEX |
|---|---|---|
| 10 | 100 | 0 |
| 15 | 80 | 1 |
| 15 | 60 | 2 |
| ⋮ | ⋮ | ⋮ |
| 50 | 20 | 9 |

400

(56) References Cited

U.S. PATENT DOCUMENTS

| 2022/0085867 | A1 | 3/2022 | Tsushima |
| 2023/0020973 | A1 | 1/2023 | Fujishiro |

FOREIGN PATENT DOCUMENTS

| JP | 4113376 | B2 * | 7/2008 |
| JP | 2011223106 | A | 11/2011 |
| JP | 2018514139 | A | 5/2018 |
| JP | 2018-125786 | A | 8/2018 |
| JP | 2019179967 | A | 10/2019 |
| JP | 2020-198597 | A | 12/2020 |
| WO | 2013/183085 | A1 | 12/2013 |
| WO | 2019/064986 | A1 | 4/2019 |
| WO | 2020/240806 | A1 | 12/2020 |
| WO | 2021193178 | A1 | 9/2021 |

* cited by examiner

F I G. 2
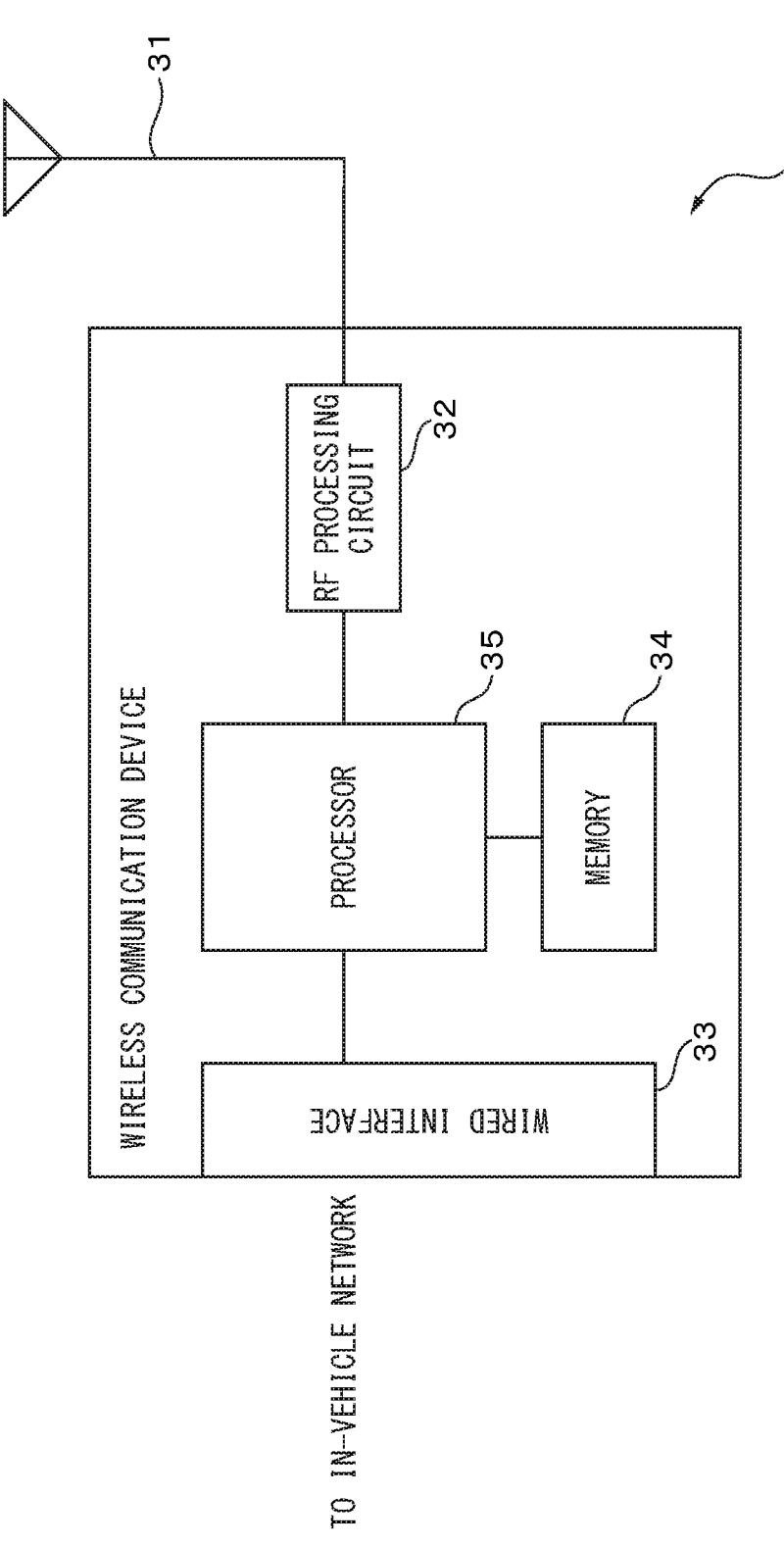

| ESTIMATE OF TRAVEL ELECTRIC POWER | REMAINING POWER VALUE | RESTRICTION INDEX |
|---|---|---|
| 10 | 100 | 0 |
| 15 | 80 | 1 |
| 15 | 60 | 2 |
| ⋮ | ⋮ | ⋮ |
| 50 | 20 | 9 |

400

F I G. 5B

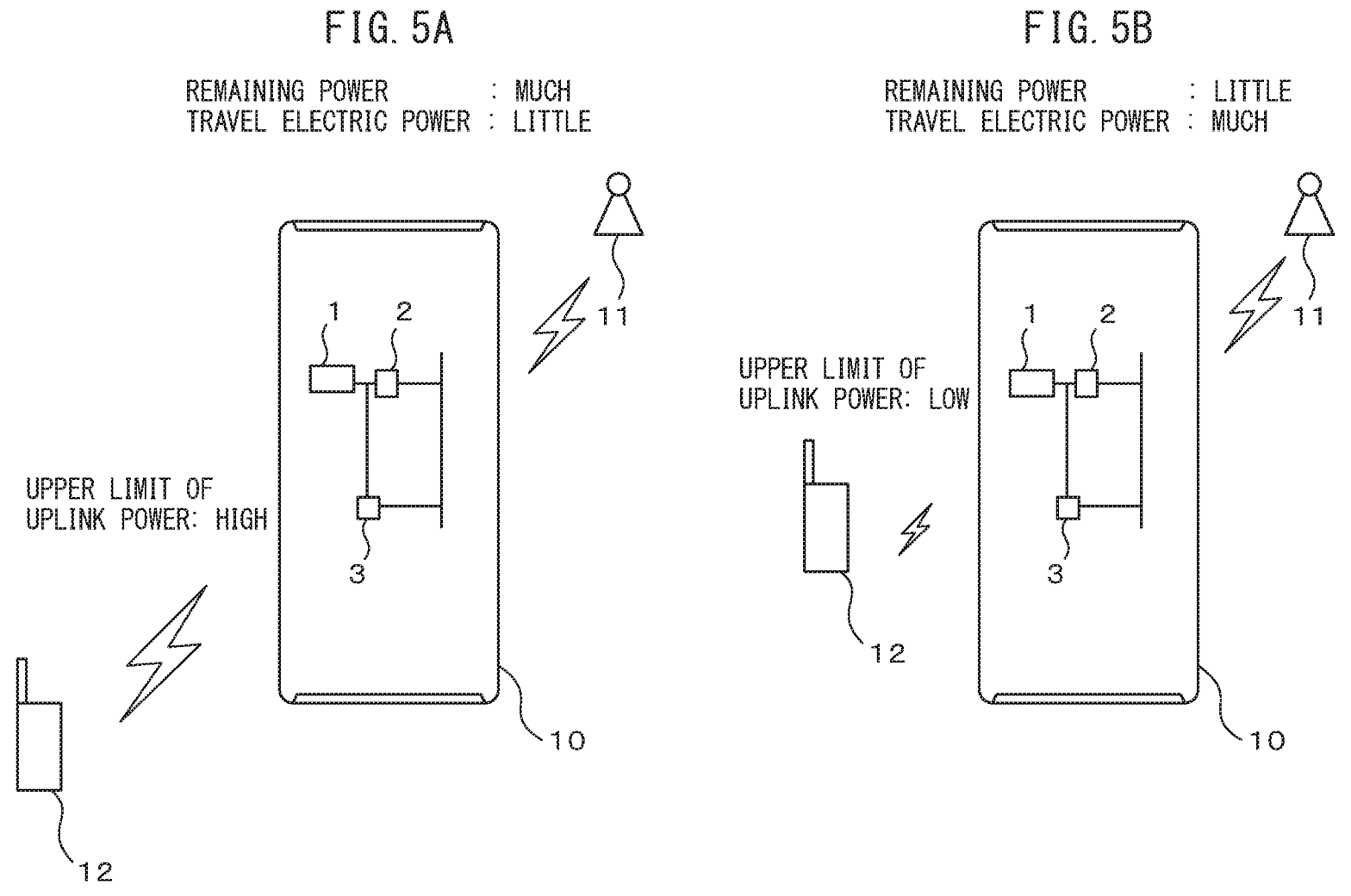

REMAINING POWER : LITTLE
TRAVEL ELECTRIC POWER : MUCH

UPPER LIMIT OF
UPLINK POWER: LOW

F I G. 5A

REMAINING POWER : MUCH
TRAVEL ELECTRIC POWER : LITTLE

UPPER LIMIT OF
UPLINK POWER: HIGH

FIG. 6

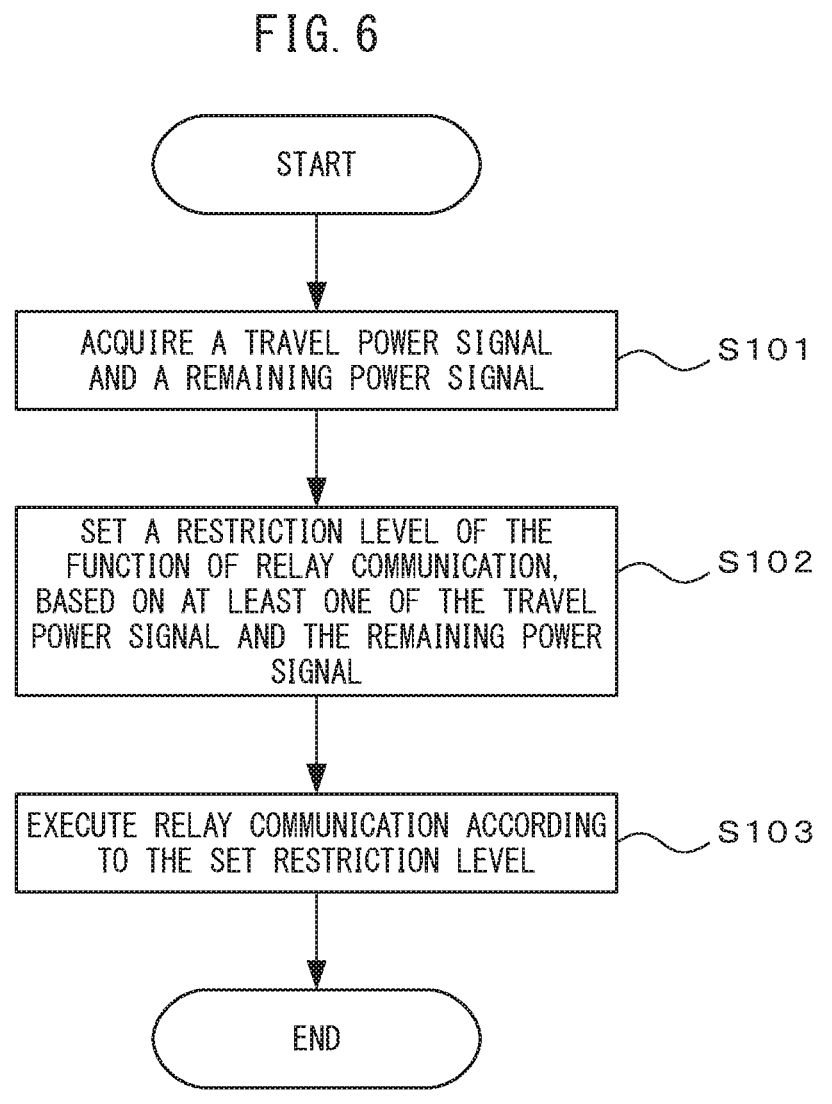

START

ACQUIRE A TRAVEL POWER SIGNAL
AND A REMAINING POWER SIGNAL
S101

SET A RESTRICTION LEVEL OF THE
FUNCTION OF RELAY COMMUNICATION,
BASED ON AT LEAST ONE OF THE TRAVEL
POWER SIGNAL AND THE REMAINING POWER
SIGNAL
S102

EXECUTE RELAY COMMUNICATION ACCORDING
TO THE SET RESTRICTION LEVEL
S103

END

RELAY BASE STATION, AND METHOD AND COMPUTER PROGRAM FOR RELAYING COMMUNICATION

FIELD

The present invention relates to a relay base station mounted on a vehicle, a method for relaying communication executed by the relay base station, and a computer program for relaying communication.

BACKGROUND

A technique has been proposed by which a communication device mounted on a vehicle relays wireless communication between a base station and a terminal outside the vehicle (see International Publication WO2019/064986A).

A communication device disclosed in WO2019/064986A operates as a terminal under control of a base station. At the time of packet reception, the communication device controls packet relay communication within a predetermined resource pool, based on at least one of information received from the base station, information obtained from the terminal itself, and information received from another terminal. The communication device is used on a mobile object, such as a vehicle.

SUMMARY

When a wireless communication device mounted on a vehicle operates by power supply from a battery of the vehicle, it is desirable to control operation of the wireless communication device so that power consumption by the wireless communication device does not affect travel of the vehicle.

It is an object of the present invention to provide a relay base station that can increase the possibility that a communication terminal in an area around a vehicle can access a base station without interfering with travel of the vehicle.

According to an embodiment, a relay base station mounted on a vehicle and configured to relay wireless communication between a base station and at least one communication terminal by power supply from a battery of the vehicle is provided. The relay base station includes a processor configured to: set a restriction level of the function of relaying wireless communication between the base station and the at least one communication terminal, based on at least one of travel power information on electric power used for travel control of the vehicle and remaining power information indicating remaining power of the battery of the vehicle, and relay the wireless communication according to the set restriction level.

The processor of the relay base station preferably is further configured to estimate power consumption caused by executing the function of relaying according to the restriction level of the relay function, and adjust the restriction level of the relay function, further based on the estimated power consumption.

Alternatively, the processor of the relay base station preferably increases the restriction level of the relay function as the electric power indicated by the travel power information increases or the remaining power of the battery indicated by the remaining power information decreases.

According to another embodiment, a method for relaying communication executed by a relay base station mounted on a vehicle and configured to relay wireless communication between a base station and at least one communication terminal by power supply from a battery of the vehicle is provided. The method includes setting a restriction level of the function of relaying wireless communication between the base station and the at least one communication terminal, based on at least one of travel power information on electric power used for travel control of the vehicle and remaining power information indicating remaining power of the battery of the vehicle; and relaying the wireless communication according to the set restriction level.

According to still another embodiment, a non-transitory recording medium that stores a computer program for relaying communication executed by a relay base station mounted on a vehicle and configured to relay wireless communication between a base station and at least one communication terminal by power supply from a battery of the vehicle is provided. The computer program includes instructions causing the relay base station to execute a process including setting a restriction level of the function of relaying wireless communication between the base station and the at least one communication terminal, based on at least one of travel power information on electric power used for travel control of the vehicle and remaining power information indicating remaining power of the battery of the vehicle; and relaying the wireless communication according to the set restriction level.

The relay base station according to the present disclosure has an advantageous effect of being able to increase the possibility that a communication terminal in an area around a vehicle can access a base station without interfering with travel of the vehicle.

BRIEF DESCRIPTION OF DRAWINGS

FIG. 2 illustrates the hardware configuration of the wireless communication device.

FIG. 5A is a diagram for explaining an example of restrictions on the function of relay communication.

FIG. 5B is a diagram for explaining an example of restrictions on the function of relay communication.

FIG. 6 is an operation flowchart of a relay communication process.

DESCRIPTION OF EMBODIMENTS

A relay base station, a method for relaying communication executed by the relay base station, and a computer program for relaying communication will now be described with reference to the attached drawings. The relay base station is mounted on a vehicle and operates by power supply from a battery of the vehicle. The relay base station can relay wireless communication between a base station and at least one communication terminal. The relay base station sets a restriction level of the function of relaying wireless communication between the base station and the at least one communication terminal, based on at least one of travel power information indicating electric power used for travel control of the vehicle and remaining power information indicating remaining power of the battery of the vehicle. In addition, the relay base station relays the wireless communication between the base station and the at least one communication terminal according to the restriction level. In the following, electric power used for travel control of the vehicle will be referred to as "travel electric power." Relaying wireless communication between a base station and at least one communication terminal will be referred to simply as "relay communication."

Figure 1:
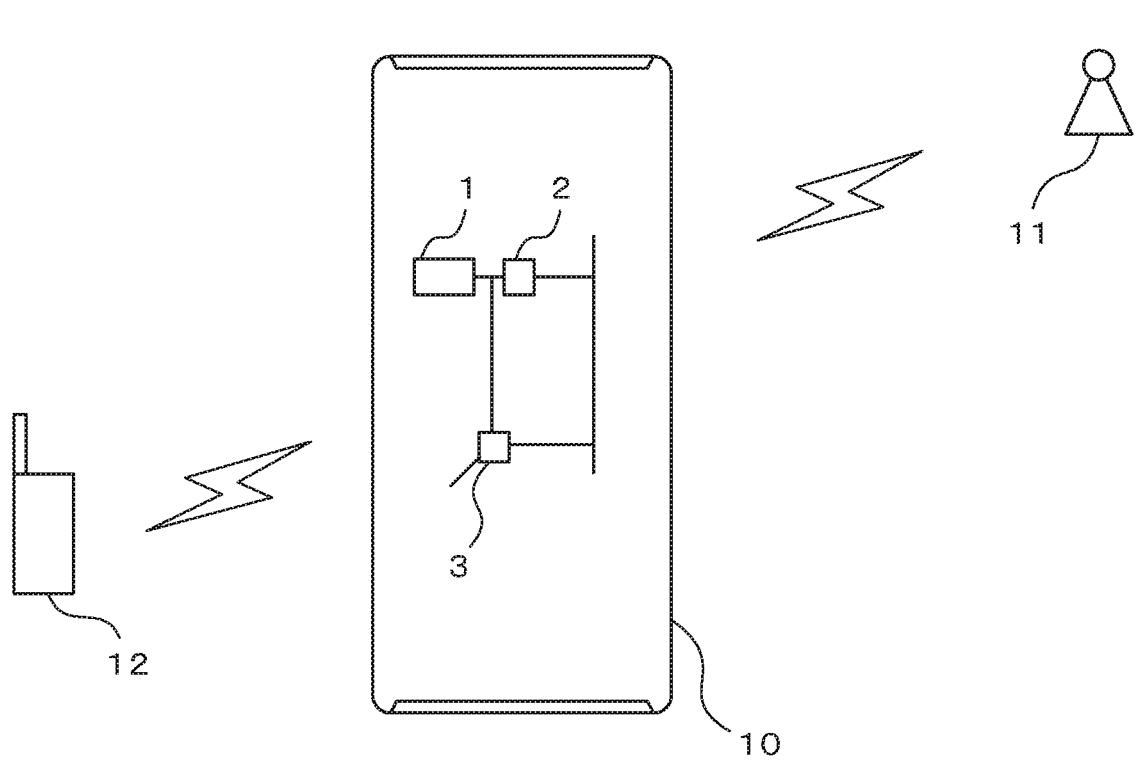
FIG. 1 schematically illustrates the configuration of a vehicle equipped with a wireless communication device, which is an example of the relay base station.

FIG. 1 schematically illustrates the configuration of a vehicle equipped with the relay base station. The vehicle 10, which is, for example, an ordinary passenger car, a bus, or a truck, includes a battery 1, an electronic control unit (ECU) 2, and a wireless communication device 3, which is an example of the relay base station. The ECU 2 and the wireless communication device 3 are communicably connected via an in-vehicle network conforming to a standard such as a controller area network. The vehicle 10 may be equipped with a camera (not illustrated) for taking pictures of the surroundings of the vehicle 10, or a distance sensor (not illustrated) for measuring the distances to objects around the vehicle 10, such as a LiDAR sensor. The vehicle 10 may be further equipped with a GPS receiver (not illustrated) for measuring the position of the vehicle 10. The vehicle 10 may be further equipped with a navigation device (not illustrated) that searches for a planned travel route of the vehicle 10 and that navigates so that the vehicle 10 travels along the planned travel route.

The battery 1 is a power source of the vehicle 10, and is composed of, for example, a lithium-ion battery or another type of chargeable and dischargeable battery as well as a control circuit for controlling charge and discharge of the battery included in the battery 1. The battery 1 supplies electric power to devices mounted on the vehicle 10, such as the ECU 2 and the wireless communication device 3. In the case where the vehicle 10 includes a motor (not illustrated) as a power source, electric power may be supplied from the battery 1 to the motor via a circuit for driving the motor, such as an inverter.

In the present embodiment, the battery 1 can be charged from charging equipment outside the vehicle 10 via an interface for charging (not illustrated) provided on the vehicle 10. The control circuit in the battery 1 outputs a signal including a value indicating the remaining power of the battery 1 (hereafter a "remaining power signal") to the ECU 2 at predetermined intervals. The value indicating the remaining power of the battery 1 in the remaining power signal is an example of the remaining power information. In the following, the value indicating the remaining power of the battery 1 will be referred to simply as a "remaining power value."

The ECU 2 controls travel of the vehicle 10 or assists a driver in driving the vehicle 10. To achieve this, the ECU 2 includes at least one processor, a memory, and a communication interface for connecting to the in-vehicle network. When a motor is used as a power source of the vehicle 10, the ECU 2 adjusts electric power supplied from the battery 1 to the motor according to an accelerator position. The ECU 2 may detect objects around the vehicle 10 from an image obtained by a camera (not illustrated) for taking a picture of the surroundings of the vehicle 10, and control the steering angle, the brake, and the accelerator of the vehicle 10 so that the vehicle 10 will not collide with a detected object. The ECU 2 further detects lane-dividing lines demarcating a lane on which the vehicle 10 is traveling from the image, and controls the steering angle, based on the detected lane-dividing lines, so that the vehicle 10 may keep its lane. Alternatively, when the vehicle 10 is about to deviate from its lane, the ECU 2 may warn the driver of the deviation via a display or another device provided in the vehicle interior.

In addition, the ECU 2 uses information received from a device outside the vehicle 10 via the wireless communication device 3 for controlling the vehicle 10. For example, the ECU 2 may refer to a high-precision map received from a map server (not illustrated) via the wireless communication device 3 to identify a road being traveled by the vehicle 10, and control components of the vehicle 10 so that the vehicle 10 travels at a regulation speed set for the identified road. The ECU 2 may compare features detected from the images, such as lane-dividing lines, with corresponding features represented in the high-precision map to identify the lane on which the vehicle 10 is traveling. When the identified lane differs from a lane leading toward a destination indicated by a planned travel route set by the navigation device (not illustrated), the ECU 2 may control components of the vehicle 10 to move to the lane leading toward the destination. The high-precision map includes various types of information used in automated driving control of the vehicle 10. For example, the high-precision map represents road markings such as lane-dividing lines, signposts, and regulation speeds of individual road sections in a region represented in the high-precision map.

In addition, the ECU 2 may use traffic information received from a traffic information server (not illustrated) via the wireless communication device 3 for controlling travel of the vehicle 10. For example, when the traffic information indicates that the planned travel route includes a section where traffic restrictions are imposed, the ECU 2 may request the navigation device to search for a detour route and make the vehicle 10 travel along the detour route received from the navigation device.

Further, the ECU 2 estimates travel electric power. For example, the ECU 2 calculates an average of electric power used for travel of the vehicle 10 per unit travel distance from changes in the remaining power of the battery 1 in the most recent predetermined period. Alternatively, the ECU 2 may calculate the total amount of electric power in the most recent predetermined period, based on those values of voltage and current supplied to components of the vehicle 10 which are measured with a voltmeter (not illustrated) and an ammeter (not illustrated) provided in the vehicle 10. The ECU 2 may calculate an average of electric power used for travel of the vehicle 10 per unit travel distance by dividing this total amount by the unit travel distance. The ECU 2 then calculates an estimate of travel electric power by multiplying the average of electric power by the distance from the current position of the vehicle 10 to a destination of the vehicle 10 indicated by a planned travel route received from the navigation device (not illustrated). The ECU 2 may use the position of the vehicle 10 indicated by the latest positioning information received from the GPS receiver (not illustrated) as the current position of the vehicle 10. Alternatively, the ECU 2 may calculate an average of electric power used for travel of the vehicle 10 per unit time from changes in the remaining power of the battery 1 in the most recent predetermined period. The ECU 2 may calculate an estimate of travel electric power by multiplying the average of electric power by an estimated travel time until reaching the destination of the vehicle 10 indicated by the planned travel route. The ECU 2 may receive the estimated travel time from the navigation device, or determine the estimated travel time by dividing the distance from the current position to the destination of the vehicle 10 by an average speed of the vehicle 10 in the most recent predetermined period. Alternatively, the ECU 2 may use an average of electric power used for travel of the vehicle 10 per unit travel distance or per unit time as an estimate of travel electric power.

The ECU 2 generates a travel power signal indicating the estimate of travel electric power every predetermined period or every time the ECU 2 receives an inquiry from the wireless communication device 3. The estimate of travel electric power is an example of the travel power information. The ECU 2 outputs the generated travel power signal and the latest remaining power signal to the wireless communication device 3 via the in-vehicle network.

Further, the ECU 2 manages the remaining power of the battery 1, based on a remaining power signal received from the battery 1. For example, when the remaining power of the battery 1 falls below a predetermined amount, the ECU 2 warns the driver that the battery 1 is running low via a display or another device provided in the vehicle interior.

Further, the ECU 2 outputs a signal to be sent to a device outside the vehicle 10, such as a request for delivery of a high-precision map, to the wireless communication device 3 via the in-vehicle network.

The wireless communication device 3, which is an example of the relay base station, operates by power supply from the battery 1 and can relay wireless communication between a base station 11 placed outside the vehicle 10 and one or more communication terminals 12 in an area around or inside the vehicle 10. In the present embodiment, the wireless communication device 3 controls the restriction level of the function of relaying wireless communication between the base station 11 and the communication terminals 12, based on at least one of the remaining power of the battery 1 and the travel electric power indicated by a remaining power signal and a travel power signal, respectively, received from the ECU 2. In the following, a signal communicated between the base station 11 and a communication terminal 12 and relayed by the wireless communication device 3 will be referred to as a "relay signal" for convenience of description.

FIG. 2 illustrates the hardware configuration of the wireless communication device 3. The wireless communication device 3 includes an antenna 31, a radio-frequency (RF) processing circuit 32, a wired interface 33, a memory 34, and a processor 35. The RF processing circuit 32, the wired interface 33, the memory 34, and the processor 35 may be mounted on the wireless communication device 3 as separate circuits or a single integrated circuit.

The antenna 31 sends an uplink signal or a downlink relay signal transmitted from the RF processing circuit 32 as a radio signal. Further, the antenna 31 receives a radio signal from the base station 11, converts the signal to an electric signal to generate a downlink signal, and transmits the downlink signal to the RF processing circuit 32. In addition, the antenna 31 receives a radio signal from a communication terminal 12, converts the signal to an electric signal to generate an uplink relay signal, and transmits the relay signal to the RF processing circuit 32. The antenna 31 may include an antenna for communication with the base station 11 and an antenna for communication with the communication terminals 12 separately.

The RF processing circuit 32 converts an uplink signal or a downlink relay signal received from the processor 35 to an analog signal, and then superposes the analog signal on a carrier wave having a radio frequency specified by the processor 35. The RF processing circuit 32 amplifies the uplink signal or the relay signal superposed on the carrier wave to a desired level with a high-power amplifier (not illustrated), and transmits the amplified uplink signal or relay signal to the antenna 31.

Further, the RF processing circuit 32 amplifies a downlink signal or an uplink relay signal received from the antenna 31 with a low-noise amplifier (not illustrated). The RF processing circuit 32 multiplies the amplified downlink signal or relay signal by a periodic signal having an intermediate frequency to convert the frequency of the downlink signal or the relay signal from the radio frequency to a baseband frequency. The RF processing circuit 32 executes analog-to-digital conversion of the downlink signal or the relay signal having a baseband frequency, and then passes the signal to the processor 35.

The wired interface 33, which is an example of an in-vehicle communication unit, includes an interface circuit for connecting the wireless communication device 3 to the in-vehicle network. In other words, the wired interface 33 is connected to the ECU 2 via the in-vehicle network. The wired interface 33 passes a remaining power signal and a travel power signal received from the ECU 2 to the processor 35, and outputs information used for travel of the vehicle 10 (e.g., a high-precision map or traffic information) received from the processor 35 to the ECU 2 via the in-vehicle network.

The memory 34, which is an example of a storage unit, includes, for example, a read-only nonvolatile semiconductor memory and a rewritable nonvolatile or volatile semiconductor memory. The memory 34 stores various types of information for communication with the base station 11 and the communication terminals 12, identifying information of the vehicle 10, and various programs executed by the wireless communication device 3. In addition, the memory 34 may temporarily store signals received from the base station 11, the communication terminals 12, or the ECU 2 (e.g., a remaining power signal and a travel power signal) and signals to be sent to the base station 11, the communication terminals 12, or the ECU 2.

The processor 35 includes one or more central processing units (CPUs) and a peripheral circuit thereof. The processor 35 may further include another operating circuit, such as a logic-arithmetic unit or an arithmetic unit. The processor 35 executes a process related to wireless communication between the base station 11 and the wireless communication device 3 and relay communication between the base station 11 and the communication terminals 12.

Figure 3:
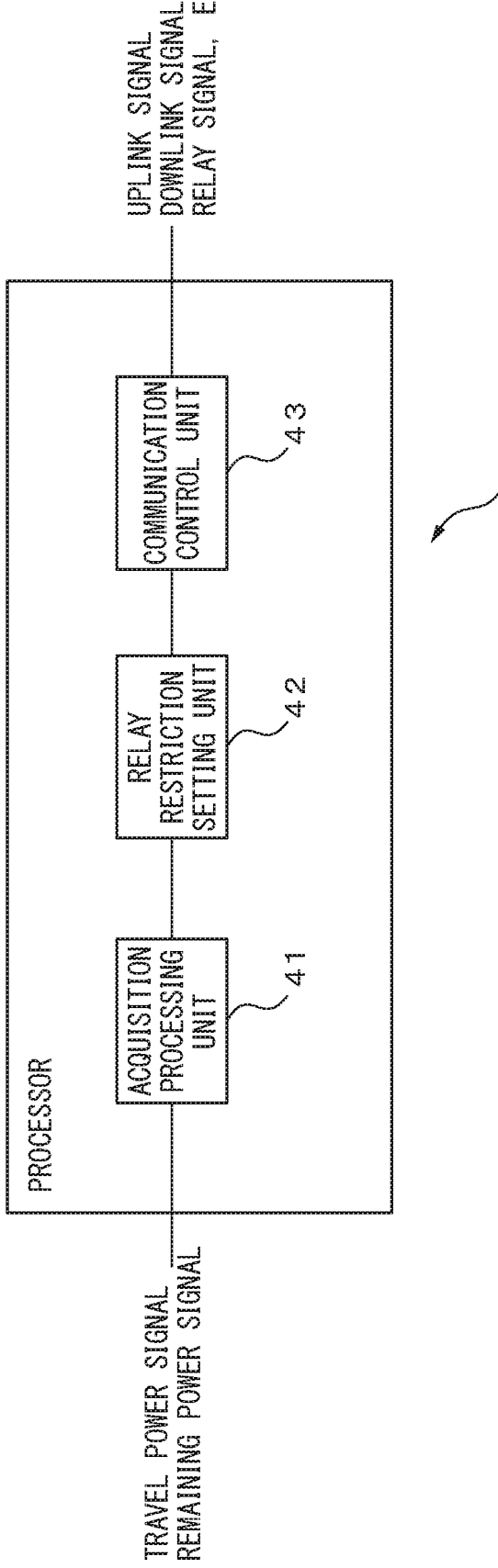
FIG. 3 is a functional block diagram of a processor of the wireless communication device.

FIG. 3 is a functional block diagram of the processor 35. The processor 35 includes an acquisition processing unit 41, a relay restriction setting unit 42, and a communication control unit 43. These units included in the processor 35 are functional modules, for example, implemented by a computer program executed by the processor 35, or may be dedicated operating circuits embedded in the processor 35.

The acquisition processing unit 41 acquires signals from the ECU 2, in particular, a travel power signal and a remaining power signal via the wired interface 33, and passes the received signals to the relay restriction setting unit 42.

The relay restriction setting unit 42 sets a restriction level of the function of relay communication, based on at least one of a travel power signal and a remaining power signal, every predetermined period or every time the travel electric power or the remaining power changes by a predetermined amount or more. In the present embodiment, the relay restriction setting unit 42 increases the restriction level of the function of relay communication as the estimate of travel electric power indicated by the travel power signal increases or the remaining power of the battery 1 indicated by the remaining power signal decreases.

To achieve this, the relay restriction setting unit 42 refers to a reference table stored in the memory 34 and representing the relationship between a combination of travel electric power and remaining power and a restriction index indicating the restriction level of the function of relay communication. The relay restriction setting unit 42 then identifies a restriction index corresponding to the combination of the estimate of travel electric power and the remaining power value of the battery 1 indicated by the received travel power signal and the remaining power signal, respectively.

Figure 4:
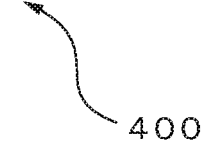
FIG. 4 illustrates an example of a reference table.

FIG. 4 illustrates an example of the reference table. In the reference table 400, each row represents a restriction index corresponding to a combination of an estimate of travel electric power and a remaining power value. In this example, the restriction level of the function of relay communication increases with the restriction index.

For example, when the restriction index is 0, the wireless communication device 3 is allowed to execute the function of relay communication without any restriction. As the restriction index increases, the wireless communication device 3 decreases maximum wireless power usable for relay communication with the communication terminals 12. In addition, as the restriction index increases, the wireless communication device 3 may reduce radio resources allocated for relay communication with the communication terminals 12 to reduce power consumption in relay communication between the communication terminals 12 and the wireless communication device 3. Alternatively, as the restriction index increases, the wireless communication device 3 may decrease the upper limit of the number of communication terminals 12 that can connect to the wireless communication device 3. A decrease in the number of communication terminals 12 connected to the wireless communication device 3 leads to a decrease in power consumption in relay communication. In this way, relay communication is restricted so that power consumption in relay communication decreases as the travel electric power of the vehicle 10 increases or the remaining power of the battery 1 decreases. For this reason, the wireless communication device 3 can execute relay communication within the limit of not interfering with travel of the vehicle 10.

According to a modified example, the relay restriction setting unit 42 may set a restriction level of the function of relay communication, based on either travel electric power or remaining power. In this case also, the relay restriction setting unit 42 identifies a restriction index indicating the restriction level of the function of relay communication by referring to a reference table representing the relationship between the travel electric power or the remaining power and the restriction index, as in the embodiment. Thus, in this modified example also, the relay restriction setting unit 42 sets the restriction level of the function of relay communication higher as the travel electric power of the vehicle 10 increases. Alternatively, the relay restriction setting unit 42 sets the restriction level of the function of relay communication higher as the remaining power of the battery 1 decreases.

The relay restriction setting unit 42 notifies the communication control unit 43 of the set restriction level of the function of relay communication, i.e., the identified restriction index.

The communication control unit 43 executes relay communication between the base station 11 and at least one communication terminal 12 according to the restriction level of the function of relay communication notified by the relay restriction setting unit 42.

When executing relay communication, the communication control unit 43 executes various processes for wireless communication between the base station 11 and the communication terminal 12 and the wireless communication device 3 in accordance with a predetermined wireless communication standard. The predetermined wireless communication standard may be, for example, a wireless communication standard related to the "fifth-generation mobile communication system" formulated by the 3rd Generation Partnership Project (3GPP, registered trademark) or a standard related to another mobile communications system. Examples of the processes for wireless communication include establishment of communication between the base station 11 and the communication terminal 12 and the wireless communication device 3, allocation of radio resources, and uplink power control. In addition, the communication control unit 43 outputs a downlink relay signal to the RF processing circuit 32 so that the relay signal received from the RF processing circuit 32 is sent to a communication terminal 12, using a radio resource allocated for wireless communication with the communication terminal 12. Similarly, the communication control unit 43 outputs an uplink relay signal to the RF processing circuit 32 so that the relay signal received from the RF processing circuit 32 is sent to the base station 11, using a radio resource allocated for wireless communication with the base station 11.

The communication control unit 43 restricts the function of relay communication, depending on the restriction index. For example, the communication control unit 43 sets the upper limit of uplink power for wireless communication with a communication terminal 12, depending on the restriction index, and determines the power of a radio signal to be sent to the communication terminal 12 within the limit. The communication control unit 43 also sets the upper limit of radio resources allocated for relay communication, depending on the restriction index, and sets a radio resource allocated for relay communication within the limit. Alternatively, the communication control unit 43 sets the upper limit of the number of communication terminals 12 that can connect to the wireless communication device 3, depending on the restriction index. The communication control unit 43 keeps the number of communication terminals 12 connected to the wireless communication device 3 within the limit, and executes relay communication. After the number of communication terminals 12 connected to the wireless communication device 3 temporarily reaches the upper limit, the communication control unit 43 connects a communication terminal 12 to the wireless communication device 3 every time relay communication for another communication terminal 12 being connected is finished. To this end, the communication control unit 43 gives a higher priority of connection to a communication terminal 12 that has sent a connection request earlier to the wireless communication device 3. Alternatively, the communication control unit 43 may give a higher priority of connection to a communication terminal 12 possessed by a user in the vehicle 10. In this case, when the user gets on the vehicle 10, identifying information of the communication terminal 12 possessed by the user is read by an RFID reader (not illustrated) provided in the vehicle 10, and is transmitted to the wireless communication device 3 via the in-vehicle network. The processor 35 stores the received identifying information in the memory 34. Thereafter, when the user gets off the vehicle 10, the identifying information of the communication terminal 12 possessed by the user is read again by the RFID reader and is transmitted to the wireless communication device 3. When the received identifying information matches identifying information of a communication terminal 12 stored in the memory 34, the processor 35 deletes the matched identifying information from the memory 34. In this way, the communication control unit 43 can determine whether the communication terminal 12 that has sent a connection request is possessed by the user in the vehicle 10 by comparing the identifying information included in the connection request with identifying information stored in the memory 34.

The communication control unit 43 may impose two or more of these restrictions simultaneously. The relationship between the restriction index and the restrictions on the function of relay communication may be prestored in the memory 34, for example, as a reference table.

Further, the communication control unit 43 executes various processes for wireless communication between the base station 11 and the wireless communication device 3 in accordance with the predetermined wireless communication standard. In addition, the communication control unit 43 generates an uplink signal including a signal to be sent to a device outside the vehicle 10 (e.g., a request for delivery of a high-precision map) received from the ECU 2, and executes an encoding process, such as error-correction coding, on the uplink signal. The communication control unit 43 further modulates the uplink signal in accordance with a predetermined modulation scheme, and outputs the modulated uplink signal to the RF processing circuit 32. In addition, the communication control unit 43 demodulates a downlink signal received from the RF processing circuit 32, executes error-correction decoding, and extracts information used for travel of the vehicle 10, such as a high-precision map or traffic information, from the decoded downlink signal. The communication control unit 43 outputs the information used for travel of the vehicle 10 extracted from the downlink signal to the ECU 2 via the wired interface 33.

FIGS. 5A and 5B are diagrams for explaining examples of restrictions on the function of relay communication. In the example illustrated in FIG. 5A, the restriction level of the function of relay communication is relatively low because the remaining power of the battery 1 of the vehicle 10 is sufficient and the travel electric power is not much. Hence, the upper limit of uplink power of a radio signal to be sent from the wireless communication device 3 to a communication terminal 12 is set relatively high. This enables the wireless communication device 3 to execute relay communication between the communication terminal 12 and the base station 11 even when the distance between the wireless communication device 3 and the communication terminal 12 is relatively long.

In the example illustrated in FIG. 5B, the restriction level of the function of relay communication is relatively high because the remaining power of the battery 1 of the vehicle 10 is little and the travel electric power is much. Hence, the upper limit of uplink power of a radio signal to be sent from the wireless communication device 3 to a communication terminal 12 is set relatively low. This enables the wireless communication device 3 to execute relay communication between the communication terminal 12 and the base station 11 only when the distance between the wireless communication device 3 and the communication terminal 12 is relatively short and no obstacle to communication exists between the wireless communication device 3 and the communication terminal 12.

FIG. 6 is an operation flowchart of a relay communication process. The processor 35 executes the relay communication process in accordance with this operation flowchart every predetermined period or every time the travel electric power or the remaining power changes by a predetermined amount or more.

The acquisition processing unit 41 of the processor 35 acquires a travel power signal and a remaining power signal from the ECU 2 via the in-vehicle network and the wired interface 33 (step S101). Upon acquisition of a travel power signal and a remaining power signal, the relay restriction setting unit 42 of the processor 35 sets a restriction level of the function of relay communication, based on at least one of the travel power signal and the remaining power signal (step S102). The communication control unit 43 of the processor 35 then executes relay communication between the base station 11 and at least one communication terminal 12 according to the restriction level of the function of relay communication (step S103). Thereafter, the processor 35 terminates the relay communication process.

As has been described above, the relay base station sets a restriction level of the function of relaying wireless communication between a base station and at least one communication terminal, based on at least one of travel power information and remaining power information, and executes relay communication according to the restriction level. Thus the relay base station can increase the possibility that a communication terminal in an area around the vehicle can access a base station without interfering with travel of the vehicle.

According to a modified example, the relay restriction setting unit 42 of the processor 35 of the wireless communication device 3 may estimate power consumption of the function of relaying according to the restriction level of the relay function, and set the restriction level of the relay function, further based on the estimated power consumption. In this case, the relay restriction setting unit 42 determines power consumption in relay communication executed according to the set restriction level in the most recent predetermined period. When the sum of the determined power consumption and the travel electric power is greater than a safety amount, which is determined by subtracting a first amount from the remaining power of the battery 1, the relay restriction setting unit 42 increases the restriction level of the relay function. For example, the relay restriction setting unit 42 decreases the upper limit of power of a radio signal to be sent to a communication terminal 12 being connected. When the sum of the power consumption and the travel electric power is not greater than the safety amount, the relay restriction setting unit 42 does not change the restriction level of the relay function. Alternatively, when the sum of the power consumption and the travel electric power is not greater than an absolute safety amount, which is determined by further subtracting a second amount from the safety amount, the relay restriction setting unit 42 may decrease the restriction level of the relay function. For example, the relay restriction setting unit 42 may increase the upper limit of the number of communication terminals 12 that can connect to the wireless communication device 3. In this way, adjusting the restriction level of the relay function according to the power consumption enables the relay restriction setting unit 42 to set the restriction level of the relay function more appropriately.

In the embodiment or modified examples, the wireless communication device 3 may receive a remaining power signal directly from the battery 1 via the in-vehicle network. Alternatively, the travel electric power and the remaining power may be managed by a server (not illustrated) placed outside the vehicle 10 and connected to a base station 11 via a core network. In this case, the vehicle 10 may be equipped with a wireless communication terminal (not illustrated) connected to the in-vehicle network and a near-field communication circuit (not illustrated) conforming to a predetermined near-field communication standard, separately from the wireless communication device 3. The wireless communication standard to which the wireless communication terminal conforms may differ from and restrict communication speed more than the wireless communication standard to which the wireless communication device 3 conforms. The predetermined near-field communication standard may be, for example, Bluetooth (registered trademark) or ZigBee (registered trademark). In this example, the wireless communication device 3 need not be connected to the in-vehicle network. Thus the wireless communication device 3 preferably includes a near-field communication circuit conforming to a predetermined near-field communication standard, instead of the wired interface 33. In this case, the ECU 2 sends a travel power signal and a remaining power signal, together with the identifying information of the vehicle 10, to the server via the wireless communication terminal at predetermined intervals. The wireless communication device 3 sends that request for a travel power signal and a remaining power signal which includes the identifying information of the vehicle 10 to the server via the base station 11 at predetermined intervals, and receives a travel power signal and a remaining power signal from the server via the base station 11. In addition, the wireless communication device 3 transfers information used for travel of the vehicle 10 received via the base station 11 to the ECU 2 via the near-field communication circuit. According to this modified example, the wireless communication device 3 can execute the same process and have the same advantageous effect as those in the embodiment even if the wireless communication device 3 is not connected to the in-vehicle network.

According to another modified example, a processor of the server may execute the function of the relay restriction setting unit 42 of the processor 35 of the wireless communication device 3. Alternatively, a host node (not illustrated) connected between the base station 11 and the core network may execute the function of the relay restriction setting unit 42. The server or the host node notifies the set restriction level of the relay function to the wireless communication device 3 via the base station 11. The communication control unit 43 of the processor 35 of the wireless communication device 3 executes relay communication according to the notified restriction level.

The computer program for causing a computer to achieve the functions of the units included in the processor of the relay base station according to the embodiment or modified examples may be provided in a form recorded on a computer-readable storage medium. The computer-readable storage medium may be, for example, a magnetic medium, an optical medium, or a semiconductor memory.

As described above, those skilled in the art may make various modifications according to embodiments within the scope of the present invention.

What is claimed is:

1. A relay base station mounted on a vehicle and configured to relay wireless communication between a base station and at least one communication terminal by power supply from a battery of the vehicle, the relay base station comprising a processor configured to:

set a restriction level of the function of relaying wireless communication between the base station and the at least one communication terminal, based on travel power information on electric power used for travel control of the vehicle; and relay the wireless communication according to the restriction level, and wherein the processor increases the restriction level as the electric power indicated by the travel power information increases.

2. The relay base station according to claim 1, wherein the processor is further configured to estimate power consumption caused by executing the function of relaying according to the restriction level, and adjust the restriction level, further based on the estimated power consumption.

3. The relay base station according to claim 1, wherein the processor is further configured to reduce radio resources allocated for relaying the wireless communication as the electric power indicated by the travel power information increases.

4. The relay base station according to claim 1, wherein the processor is further configured to lower an upper limit of a number of the at least one communication terminal that can be connected to the relay base station in relaying the wireless communication as the electric power indicated by the travel power information increases.

5. A method for relaying communication executed by a relay base station mounted on a vehicle and configured to relay wireless communication between a base station and at least one communication terminal by power supply from a battery of the vehicle, the method comprising:

setting a restriction level of the function of relaying wireless communication between the base station and the at least one communication terminal, based on travel power information on electric power used for travel control of the vehicle; and relaying the wireless communication according to the restriction level, wherein setting the restriction level includes increasing the restriction level as the electric power indicated by the travel power information increases.

6. A non-transitory recording medium that stores a computer program for relaying communication executed by a relay base station mounted on a vehicle and configured to relay wireless communication between a base station and at least one communication terminal by power supply from a battery of the vehicle, the computer program causing the relay base station to execute a process comprising:

setting a restriction level of the function of relaying wireless communication between the base station and the at least one communication terminal, based on travel power information on electric power used for travel control of the vehicle; and relaying the wireless communication according to the restriction level, wherein setting the restriction level includes increasing the restriction level as the electric power indicated by the travel power information increases.

* * * * *